(12) United States Patent  (10) Patent No.: US 6,739,058 B2
Warashina et al.  (45) Date of Patent: May 25, 2004

(54) PLANT CUTTER APPARATUS

(75) Inventors: Makoto Warashina, Wako (JP); Hiroaki Uchitani, Wako (JP); Hideshi Sasaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 55 days.

(21) Appl. No.: 10/079,157

(22) Filed: Feb. 20, 2002

(65) Prior Publication Data

US 2002/0124416 A1 Sep. 12, 2002

(30) Foreign Application Priority Data

Mar. 6, 2001 (JP) ........................................ 2001-062498

(51) Int. Cl.[7] .............................................. A01D 34/68
(52) U.S. Cl. .......................... 30/276; 464/180; 464/183
(58) Field of Search ..................... 30/276, 347; 56/12.7; 464/180, 183; 29/455.1

(56) References Cited

U.S. PATENT DOCUMENTS 2,551,710 A * 5/1951 Slaughter ..................... 362/355
4,953,294 A * 9/1990 Dohse .......................... 30/276
5,175,932 A * 1/1993 Lange et al. ................... 30/276

FOREIGN PATENT DOCUMENTS

JP 51064732 5/1976
JP 02016593 5/1990

* cited by examiner

Primary Examiner—Douglas D. Watts
(74) Attorney, Agent, or Firm—Adams & Wilks

(57) ABSTRACT

A plant cutter apparatus has a one-piece handling rod having an outer pipe portion, an inner pipe portion disposed concentrically within the outer pipe portion, and first, second and third radial stay portions extending between and interconnecting the outer pipe portion and the inner pipe portion. The first, second and third radial stay portions are arranged at non-equal angular intervals such that an angle $\theta 1$ formed between the first and second stay portions, an angle $\theta 2$ formed between the second and third stay portions, and an angle $\theta 3$ formed between the third and first stay portions differ from each other. A drive shaft extends through the inner pipe portion and is rotatably supported within the inner pipe portion via a bushing disposed between the drive shaft and the inner pipe portion. A drive source unit is mounted at one end of the handling rod for rotating the drive shaft. A cutter blade is mounted at another end of the handling rod and is connected to the drive shaft for rotation therewith.

16 Claims, 8 Drawing Sheets

PLANT CUTTER APPARATUS

FIELD OF THE INVENTION

The present invention relates to an improvement in plant cutter apparatus for cutting plants, such as weeds, bushes or grasses.

BACKGROUND OF THE INVENTION

Generally, weeds growing on footpaths between rice fields etc. have to be cut several times a year because they tend to be nested by pests. The weed cutting is usually very laborious, and thus various automatic weed cutters have heretofore been proposed and put to practical use, among which shoulder-hung weed cutters are very popular because of their small size and handling ease. In most of the shoulder-hung weed cutters, a driving-force transmission shaft or drive shaft, which is passed through a pipe-shaped handling rod, is rotated via an engine provided at one end of the handling rod so as to rotate a cutter blade provided at the other end of the handling rod. In most cases, a human operator hangs the weed cutter on his or her shoulder using a hanging belt, and cuts weeds with the rotating cutter blade by gripping a U-shaped handle provided on an intermediate position of the handling rod to swing the handling rod in front-and-rear and left-and-right directions.

In recent years, there have been strong demands for further improvements in agricultural working environment. In the case of the shoulder-hung weed cutters too, there is an increasing demand for reduction in vibrations that are transmitted from the engine via the handling rod to the U-shaped handle, with a view to lowering the load on the human operator.

Because the weed or plant cutters are often used in farmland or the like where no AC power source is available, they ordinarily employ, as a prime mover or drive source unit, a small engine that is not equipped with a balancer to attenuate secondary vibrations. In such a small engine, the direction of vibrating force produced as the crankshaft is rotated by reciprocating motion of the piston (vibrating direction) can vary over a 360° range about the crankshaft. The drive shaft and handling rod connected to the drive source unit are subject to influences of the vibrations caused by the rotating crankshaft, and the direction of vibrations transmitted to the drive shaft and handling rod can also vary over a 360° range about an axial centerline of the handling rod. The vibrations transmitted from the drive source unit to the drive shaft comprise two major components: one component delivered from the drive source unit via the drive shaft to the handling rod; and the other component delivered from the drive source unit directly to the handling rod.

One example of a weed cutter designed to reduce vibrations transmitted from the drive source unit via the drive shaft to the handling rod is known from Japanese Utility Model Publication No. HEI-2-16593. In the weed cutter disclosed in this publication, the drive shaft, passed through the pipe-shaped handling rod, is rotated by an internal combustion engine to thereby rotate the cutter blade on the distal end of the handling rod. The drive shaft is rotatably supported within the handling rod via a bearing assembly incorporated in the handling rod. However, this disclosed weed cutter would encounter significant limitations in reducing the vibrations transmitted from the drive source unit via the drive shaft to the handling rod.

On the other hand, an example of a weed cutter designed to reduce vibrations transmitted from the drive source unit directly to the handling rod is known from Japanese Utility Model Laid-open Publication No. 51-64732. In the weed cutter disclosed in this publication, a vibration isolation device is provided, and the drive source unit is mounted, via a clutch housing, at one end of the pipe-shaped handling rod having the drive shaft passed therethrough. The clutch housing has accommodated therein a clutch operating between the output shaft of the drive source unit and the drive shaft. Further, in the disclosed weed cutter, a connection pipe is secured to the one end of the handling rod and extends toward the engine, and a vibration isolation member of the vibration isolation device is interposed between opposed surfaces of the connection pipe and clutch housing. Thus, the drive source unit is supported by the handling rod via the vibration isolation member in such a manner that vibrations transmitted from the drive source unit to the handling rod can be suppressed by means of the vibration isolation member. However, this weed cutter would also encounter significant limitations in reducing the vibrations transmitted from the drive source unit to the handling rod; namely, despite the provision of the vibration isolation device, the cutter can not prevent, to a satisfactory degree, the vibrations from passing from the drive source unit to the handling rod.

Nevertheless, the human operator always wants the vibrations of the handling rod to be minimized, with a view to lowering the load on the operator. For that purpose, some arrangements have to be made for preventing the handling rod to resonantly vibrate with the vibrations delivered from the drive source unit, and the handling rod itself still has some room for improvement. But, the vibrations delivered from the drive source unit tend to greatly vary in frequency, and it is not easy to properly deal with all the vibration frequencies.

In order to avoid the handling rod's resonant vibrations, it is conceivable to set the inherent vibrating frequency of the handling rod to be greater than all possible frequencies of vibrations transmitted from the drive source unit. However, since the handling rod of the weed cutters is an elongated member having the drive shaft passed therethrough, it must be a lightweight and inexpensive component part that can yet secure necessary mechanical strengths, such as torsional and bending strengths and modulus of longitudinal elasticity, for desired functions.

SUMMARY OF THE INVENTION

In view of the foregoing, it is an object of the present invention to provide a plant cutter apparatus which can effectively prevent a handling rod from vibrating resonantly with vibrations transmitted from a drive source unit to the handling rod and which permits reduction in weight and cost of the handling rod while securing necessary mechanical strengths of the rod.

According to an aspect of the present invention, there is provided a plant cutter apparatus which comprises a handling rod including an outer pipe portion, an inner pipe portion passed through the outer pipe portion, and three stay portions interconnecting the outer pipe portion and the inner pipe portion, a drive shaft passed through and rotatably supported within the inner pipe portion via a bushing, a drive source unit mounted at one end of the handling rod for rotating the drive shaft, and a cutter blade mounted at the other end of the handling rod for being rotated by rotation, via the drive source unit, of the drive shaft. In the cutter apparatus of the present invention, the three stay portions, which consist first, second and third stay portions, are arranged at non-equal angular intervals such that an angle θ1 formed by the first and second stay portions, an angle θ2 formed by the second and third stay portions and an angle θ3 formed by the third and first stay portions differ from each other. Also, in the cutter apparatus of the present invention, the outer pipe portion and the inner pipe portion are formed integrally in one piece.

The present invention is characterized in that the three stay portions interconnecting the outer and inner pipe portions are arranged, about an axial centerline of the handling rod, at non-equal angular intervals in such a manner that the angles θ1, θ2, θ3 formed between the three stay portions differ from each other. Thus, the three stay portions of the handling rod present a sectional configuration asymmetrical about the axial centerline. As a consequence, the geometric moment of inertia of the thus-constructed handling rod takes different values in all angular positions about the axial centerline, and thus the inherent vibrating frequency of the rod also takes different values in all the angular positions.

Vibrations transmitted from the drive source unit to the handling rod can vary in direction over a 360° range about the rod's axial centerline. When the vibrating frequency of vibrations produced in a given vibrating direction and transmitted from the drive source unit has coincided with the rod's inherent vibrating frequency, such frequency coincidence is merely a temporary or passing occurrence. Namely, the rod's inherent vibrating frequency can coincide with the frequency of vibrations from the drive source unit in only one of the angular positions, so that resonant vibrations of the handling rod can be avoided relatively easily.

Since the handling rod is in the form of an integrally-formed dual pipe structure where the inner and outer pipe portions and are interconnected via the stay portions angularly spaced from one another at the non-equal angular intervals, the rod can be manufactured as a one-piece component part having a simplified sectional configuration although it can exhibit great mechanical strengths. Thus, the invention can reduce the manufacturing cost and overall weight of the handling rod while securing the necessary mechanical strengths of the rod.

In a preferred embodiment, the angle θ1 formed by the first and second stay portions is set to be greater than 60° but smaller than 120°. If the angle θ1 is set to a relatively great angle less than 120°, the three angles θ1, θ2 and θ3 can become closer to one another, which will achieve better balance of the geometric moment of inertia and also secure relatively great values of the geometric moment of inertia in any angular positions of the rod.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
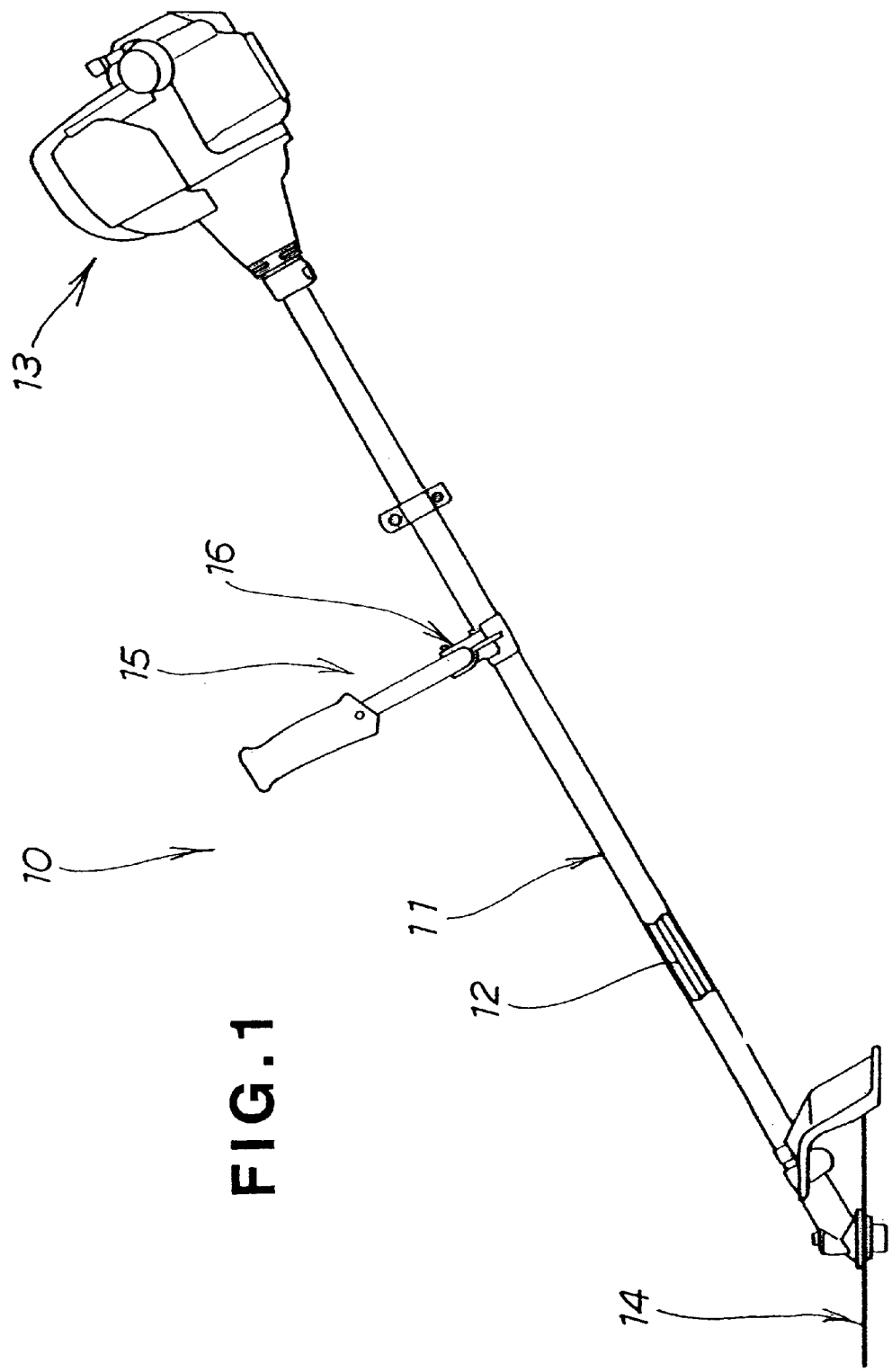
FIG. 1 is a side view showing a plant cutter apparatus in accordance with an embodiment of the present invention.
Figure 2:
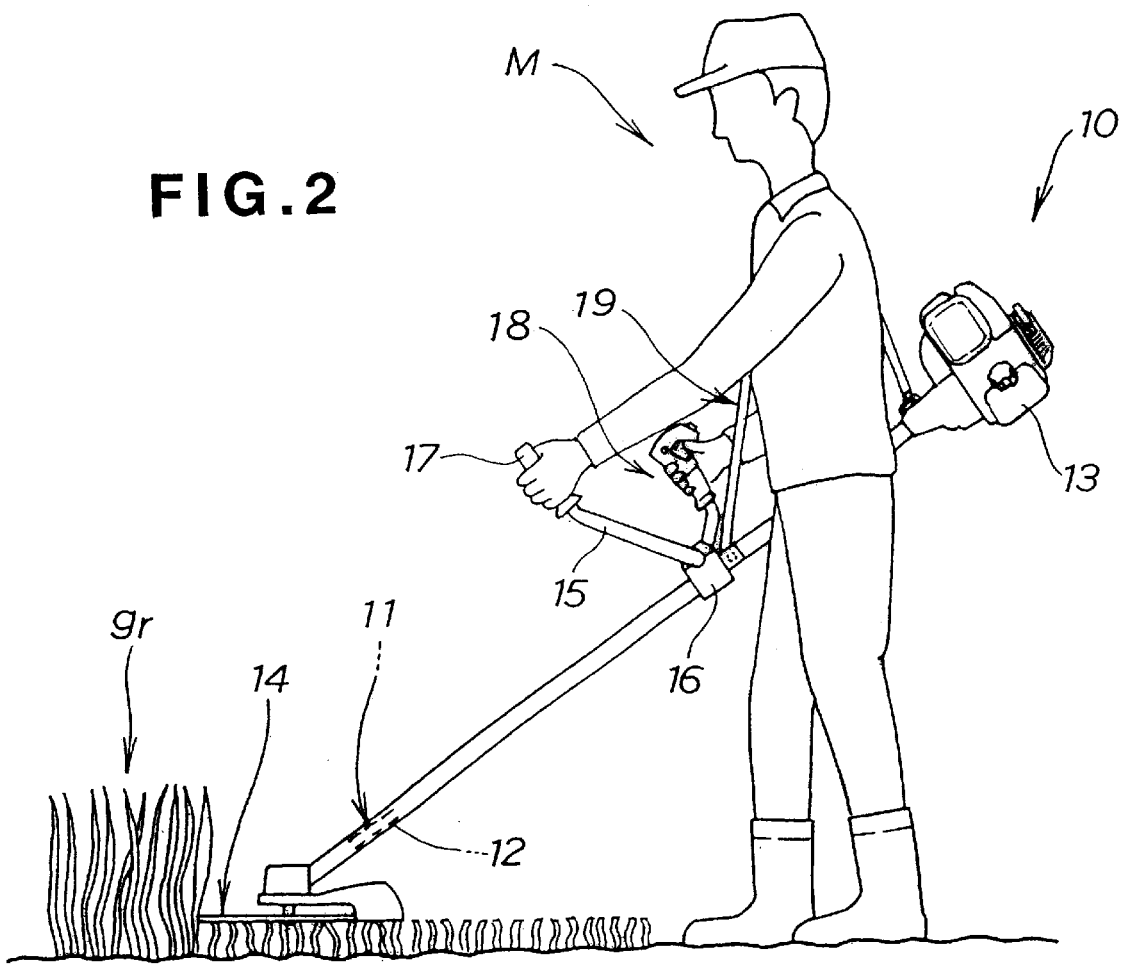
FIG. 2 is a view explanatory of a manner in which the plant cutter apparatus of FIG. 1 is used to cut weeds.

FIGS. 1 and 2 show a plant cutter apparatus 10 in accordance with an embodiment of the present invention that is designed to cut unwanted plants such as bushes, weeds or grass. The plant cutter apparatus 10 includes a pipe-shaped handling rod 11, a driving-force transmission shaft or drive shaft 12 longitudinally passed through the handling rod 11, a prime mover or drive source unit 13, such as an engine or electric motor, mounted at one end of the handling rod 11, and a cutter blade 14 mounted at the other end of the handling rod 11. The drive shaft 12 can be rotated by activation of the drive source unit 13 so that the cutter blade 14 can be rotated by the drive source unit 13 via the drive shaft 12. The plant cutter apparatus 10 also includes a U-shaped handle 15 that is mounted on the handling rod 11 substantially at a longitudinally-middle portion thereof. Specifically, the handle 15 is fixed to the handling rod 11 by means of a handle holder 16, and has left and right grips 17 and 18. The right grip 18 of the handle 15 is an operator member provided with a throttle lever and lock lever for controlling the drive source unit 13.

As seen in FIG. 2, a human operator M can shoulder the plant cutter apparatus 10 on his or her shoulder using a hanging belt 19 secured at its opposite ends to intermediate portions of the handling rod 11. The human operator M can cut weeds gr by causing the cutter blade 14 to rotate via the drive source unit 13 while swinging the cutter blade 14 in front-and-rear and left-and-right directions using the grips 17 and 18.

Figure 3:
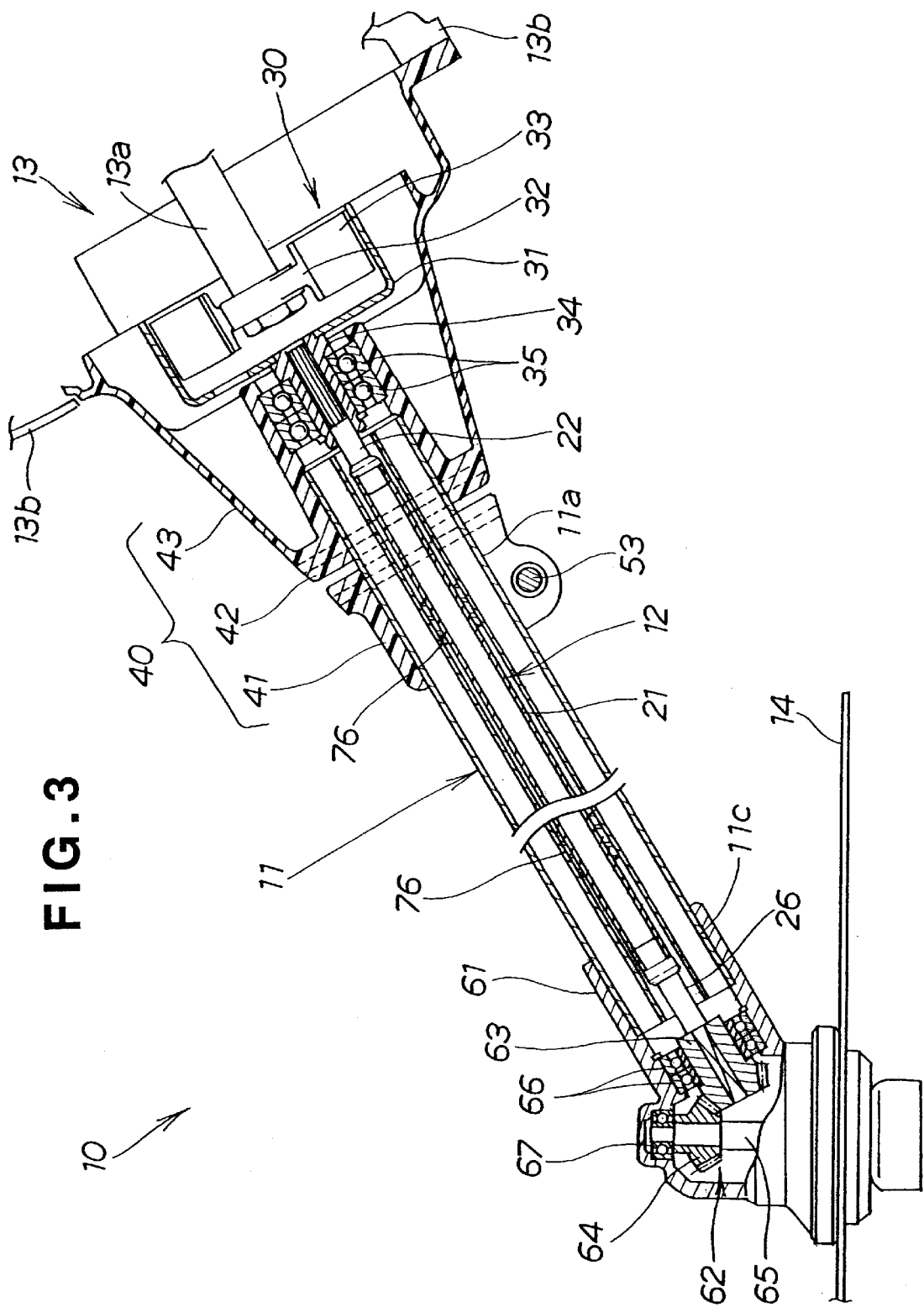
FIG. 3 is an enlarged sectional view of the plant cutter apparatus of FIG. 1.

FIG. 3 is a sectional view of the plant cutter apparatus 10, which particularly shows a clutch mechanism 30 that is accommodated in a clutch case 40 and provided between the drive shaft 12 and an output shaft 13a of the drive source unit 13 (e.g., output end of a crankshaft of an engine). Namely, the drive source unit 13 is mounted at the one end of the handling rod 11 via the clutch case 40. In the plant cutter apparatus 10, the handling rod 11 and drive shaft 12 are positioned co-axially with the output shaft 13a of the drive source unit 13.

The drive shaft 12 is a "different-metal-combined shaft", which is made of a combination of different kinds of metals. Specifically, the drive shaft 12 includes a pipe-shaped main shaft portion 21 made of a titanium alloy, a drive-side end shaft portion 22 secured to one end of the pipe-shaped main shaft portion 21 such as by vacuum brazing, and a cutter-side end shaft portion 26 secured to the other end of the main shaft portion 21 such as by vacuum brazing; both of the drive-side end shaft portion 22 and cutter-side end shaft portion 26 are made of steel. The titanium alloy has substantially the same mechanical strengths (torsional strength, bending strength, modulus of longitudinal elasticity, etc.) as the steel. Therefore, the titanium-alloy-made main shaft portion 21 can sufficiently secure torsional and bending rigidity that is normally required of the plant cutter's drive shaft, even where the main shaft portion 21 has the same diameter as the conventional counterparts.

Further, whereas the steel has a specific gravity of about 7.8, the titanium alloy has a specific gravity of about 4.5; namely, the specific gravity of the titanium alloy is very much smaller than that of the steel. Thus, the titanium-alloy-made main shaft portion 21 employed in the instant embodiment can minimize vibrations caused by sagging (sagging vibrations) due to the own weight of the shaft portion 21. Consequently, it is possible to minimize, with simple construction, vibrations transmitted from the drive shaft 12 to the handle 15 via the handling rod 11 when the drive source unit 13 is activated, as a result of which the load on the human operator M can be lessened to a significant degree. Furthermore, because the steel-made drive-side end shaft portion 22 and cutter-side end shaft portion 26 are integrally joined to the opposite ends of the titanium-alloy-made main shaft portion 21, it is possible to secure durability in the portions of the drive shaft 12 where the end shaft portions 22 and 26 are joined to the main shaft portion 21.

The clutch mechanism 30 is a centrifugal clutch, which includes a clutch drum 31 that is spline-coupled with the drive-side end shaft portion 22 of the drive shaft 12, a rotation member 32 connected to the output shaft 13a of the drive source unit 13 and a clutch member 33 that brings the rotation member 32 into engagement with the clutch drum 31 only when the rotation member 32 is turning at high speed. The clutch drum 31 is a cup-shaped member surrounding the rotation member 32.

The clutch case 40 is an integrally-molded component part made of a resin material, which includes a handling-rod mounting portion 41 coupled with one end portion 11a of the handling rod 11, a flexible coupling portion 42 having given flexibility and extending from the handling-rod mounting portion 41 toward the drive source unit 13 and a drive-source mounting portion 43 extending from the flexible coupling portion 42 toward the drive source unit 13 and coupled with the drive source unit 13. The clutch case 40 is preferably made of nylon resin having fiberglass mixed therein.

The above-mentioned handling-rod mounting portion 41 and drive-source mounting portion 43 have greater rigidity than the flexible coupling portion 42, so as to reliably support the handling rod 11 and drive source unit 13. The flexible coupling portion 42 has relatively small rigidity so that it has such flexibility as to effectively attenuate vibrations of the drive source unit 13. The drive-source mounting portion 43 is bolted to a case 13b of the drive source unit 13.

Because the clutch case 40 is a one-piece component part integrally molded to provide the handling-rod mounting portion 41, flexible coupling portion 42 and drive-source mounting portion 43, it can decrease the number of parts of the cutter apparatus and thus simplify the construction of the cutter apparatus.

The cutter blade 14 is rotatably connected to the other end 11c of the handling rod 11 via a transmission mechanism case 61. The transmission mechanism case 61 accommodates therein a transmission mechanism 62 disposed between the drive shaft 12 and the cutter blade 14. The transmission mechanism 62 includes a driving bevel gear 63 connected to the cutter-side end shaft portion 26, a driven bevel gear 64 meshing with the driving bevel gear 63, and a driven shaft 65 having mounted thereon the driven bevel gear 64 and cutter blade 14.

The drive shaft 12 is rotatably supported at a plurality of positions thereof spaced from each other in its longitudinal direction, as described below.

First, the one end portion of the drive shaft 12 is rotatably supported by the drive-source mounting portion 43 via a boss 34 and a plurality of bearings 35. Specifically, the drive-side end shaft portion 22 of the drive shaft 12 is spline-coupled to the boss 34 of the clutch drum 31, and the boss 34 is supported via the plurality of bearings 35.

Second, the other end portion of the drive shaft 12 is rotatably supported by the transmission mechanism case 61 via the driving bevel gear 63 and a plurality of bearings 66. Specifically, the cutter-side end shaft portion 26 of the drive shaft 12 is coupled with the driving bevel gear 63, and the driving bevel gear 63 is supported via the plurality of bearings 66.

Third, an intermediate portion of the drive shaft 12 between the drive-side end shaft portion 22 and the cutter-side end shaft portion 26 is rotatably supported by the handling rod 11 via a plurality of bushings 76 provided on the drive shaft 12 and spaced from each other at uniform intervals in the longitudinal direction thereof. Note that reference numeral 67 in FIG. 3 represents bearings for supporting the driven shaft 65.

FIGS. 4 to 8 shows how the handling rod 11 and clutch case 40 are coupled each other.

Figure 4:
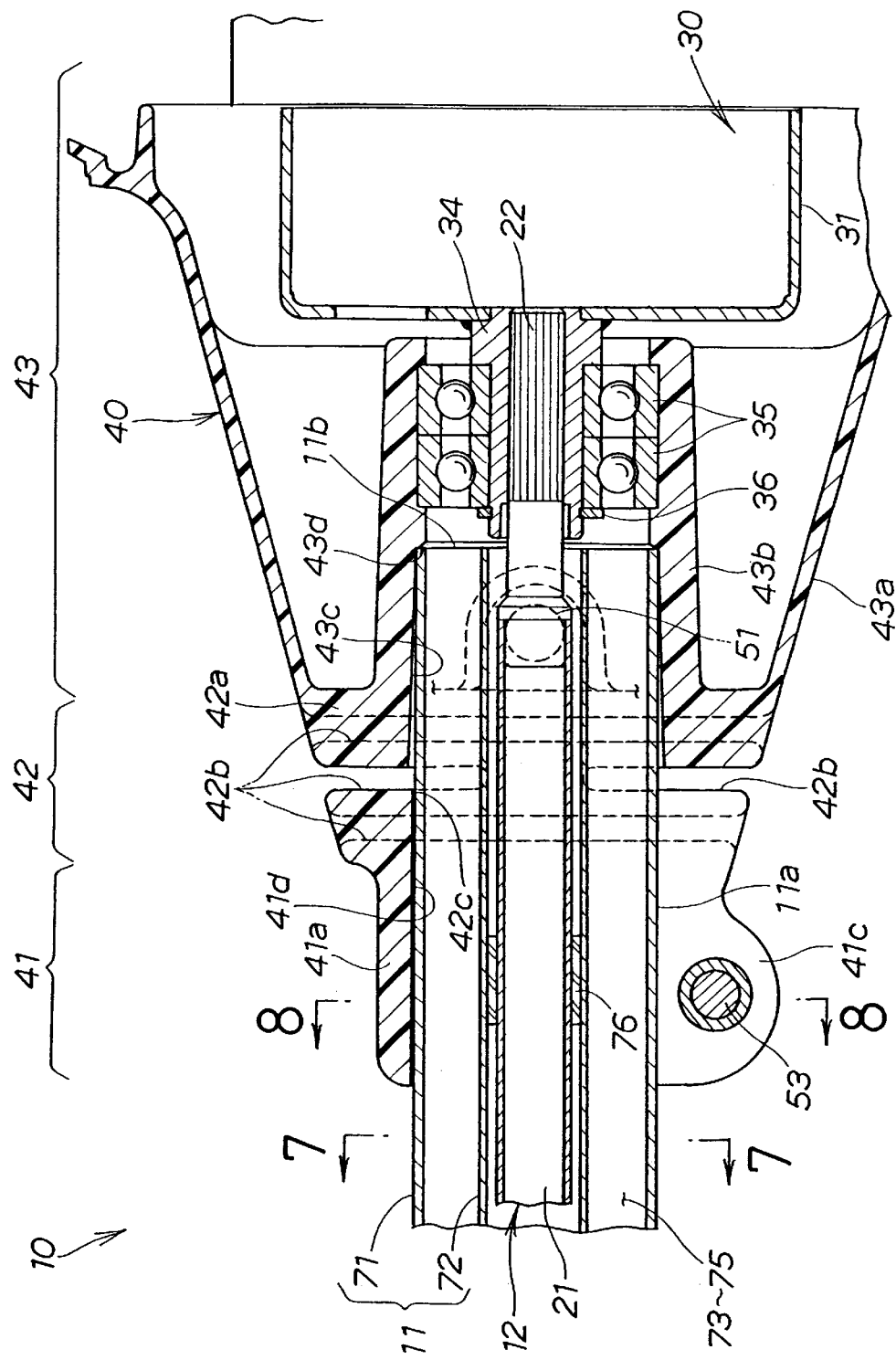
FIG. 4 is an enlarged sectional view of the plant cutter apparatus, which particularly shows how a handling rod and clutch case of FIG. 3 are coupled with each other.

As clearly seen in FIG. 4, the handling-rod mounting portion 41 and flexible coupling portion 42 together constitute a cylindrical body in which the one end portion 11a of the pipe-shaped handling rod 11 is inserted. The drive-source mounting portion 43 has a tapered outer cylindrical portion 43a increasing in diameter in a direction toward the clutch mechanism 30, and an inner cylindrical portion 43b integrally formed with the tapered outer cylindrical portion 43a in concentric relation thereto. The inner cylindrical portion 43b has an axial loosely-fitting hole 43c, and it also has an abutting region 43d deep in the hole 43c. The drive-source mounting portion 43 also has bearings 35.

Figure 5:
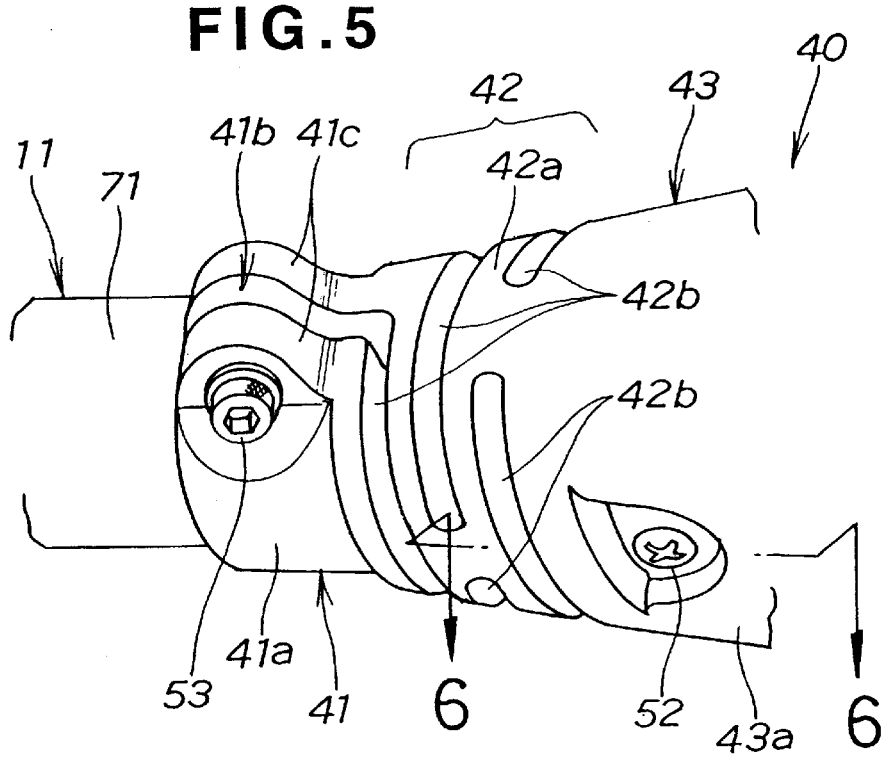
FIG. 5 is a perspective view of the clutch case shown in FIG. 4.

The loosely-fitting hole 43c is provided for receiving the one end portion 11a of the handling rod 11, inserted in the clutch case 40 via the handling-rod mounting portion 41, in a loose-fitting engagement such that the rod's one end portion 11a is slidable in the axial direction. The loosely-fitting hole 43c tapers off in a direction toward the abutting region 43d. The one end portion 11a of the handling rod 11 can abut at its end surface 11b against the abutting region 43d deep in the hole 43c of the inner cylindrical portion 43b. Reference numeral 36 in the figure represents a locking ring 36. The handling-rod mounting portion 41 has an axial slit 41b formed in its cylindrical body 41a (FIG. 5). Details of the mounting portion 41 will be discussed later in relation to FIG. 8.

As best seen in FIG. 5, the flexible coupling portion 42 of the clutch case 40 has a plurality of rows of circumferential slits 42b at predetermined axial intervals. Each of the circumferential slits 42b is a through-hole formed across the thickness of a cylindrical wall 42a to communicate with an axial through-hole 42c of the flexible coupling portion 42 (and hence the loosely-fitting hole 43c) and elongated in the circumferential direction of the cylindrical wall 42a of the coupling portion 42; each of the circumferential slits 42b extends only part of the circumference of the cylindrical wall 42a. These slits 42b are staggered along the axial direction of the cylindrical wall 42a. Thus, in an imaginary sectional view of the flexible coupling portion 42 drawn by cutting the coupling portion 42 crosswise through an area where two circumferential slits 42b are present, the two circumferential slits 42b are symmetrical with each other about the axial centerline of the cylindrical wall 42a. The provision of these circumferential slits 42b allows the coupling portion 42 to have desired flexibility.

Figure 6:
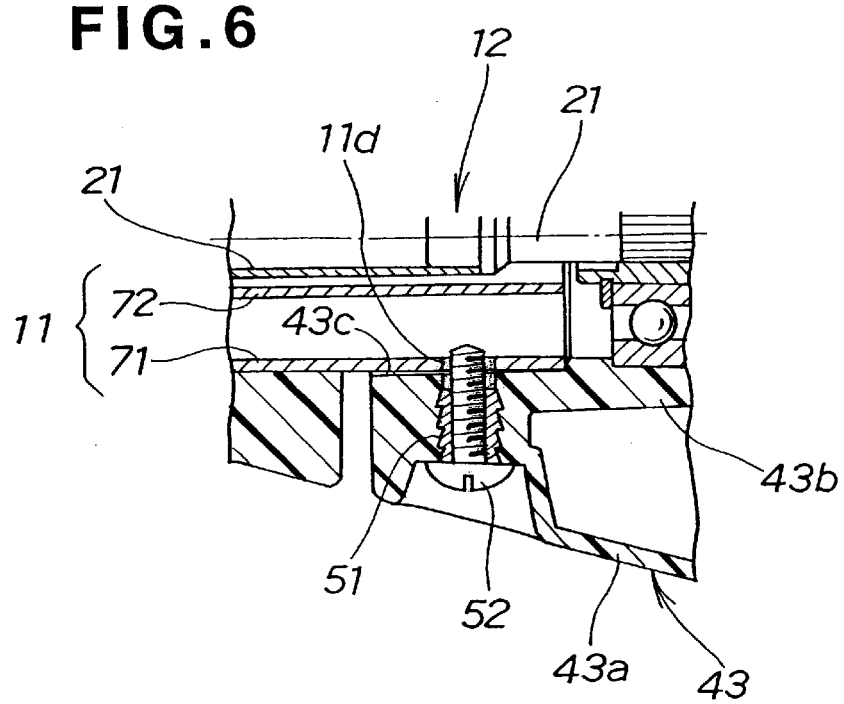
FIG. 6 is a sectional view taken along the 6—6 line of FIG. 5.

FIG. 6 is a sectional view taken along the 6—6 line of FIG. 5, which shows a peripheral area of the drive-source mounting portion 43 where an insert nut 51 is embedded to open into the interior of the mounting portion 43 and a screw 52 is driven through the insert nut 51. Specifically, the handling rod 11 includes an inner pipe portion 72, and an outer pipe portion 71 having an axial through-hole lid formed across the thickness of a wall defining the pipe portion 71. The screw 52 driven through the insert nut 51 into the axial through-hole 11d of the handling rod 11 functions to prevent the handling rod 11 from accidentally disconnecting from the drive-source mounting portion 43. The disconnection-preventing screw 52 may be replaced with a bolt, rivet or the like having a similar disconnection-preventing function.

Figure 7:
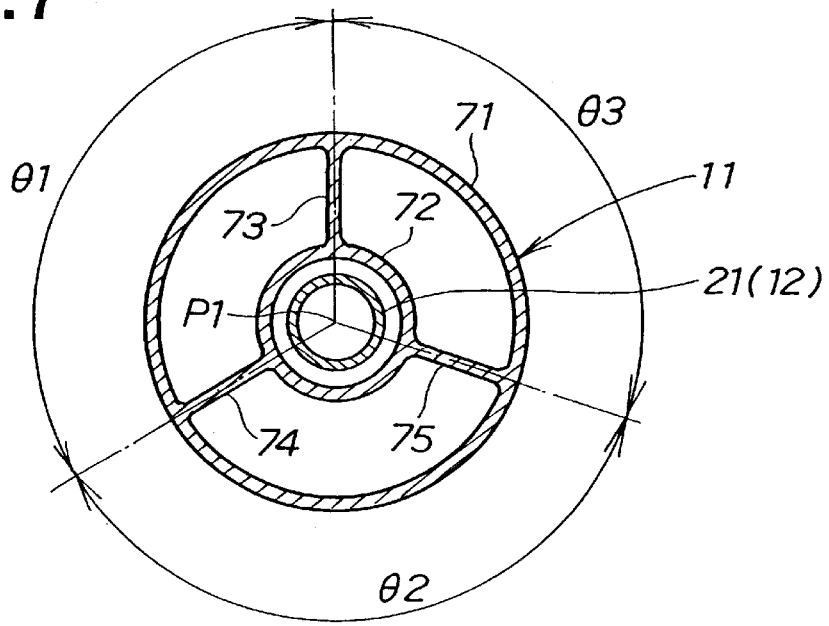
FIG. 7 is a sectional view of the handling rod taken along the 7—7 line of FIG. 4.

FIG. 7 is a sectional view of the handling rod 11 taken along the 7—7 line of FIG. 4. In the handling rod 11, the inner pipe portion 72 extends through the interior of the outer pipe portion 71, and these inner and outer pipe portions 72 and 71 are interconnected via three radial ridges or stay portions 73, 74 and 75. The inner and outer pipe portions 72, 71 and radial stay portions 73, 74, 75 are formed integrally as a one-piece component part. Namely, the handling rod 11 is substantially in the form of an integrally-formed dual pipe structure that generally has a circular contour in cross-section and that has the inner and outer pipe portions 72 and 71 interconnected via the radial stay portions 73, 74 and 75 in concentric relation to each other. The three radial stay portions 73, 74 and 75 will hereinafter be called a first stay portion 73, second stay portion 74 and third stay portion 75, respectively. In the handling rod 11, an angle θ1 formed by the first and second stay portions 73 and 74 is set to be greater than 60° but smaller than 120° (60°<θ<120°), an angle θ2 formed by the second and third stay portions 74 and 75 is set to about 120°, and an angle θ2 formed by the third and first stay portions 75 and 73 is set to the remaining angle (i.e. 360°−(θ1+θ2); note that the angle θ1 is neither equal to the angle θ2 nor equal to the angle θ3 (θ1≠θ2 and θ1≠θ3).

Namely, the three radial stay portions 73, 74 and 75 are arranged about an axial centerline P1 of the handling rod 11 at non-equal angular intervals (θ1≠θ2, θ2≠θ3 and θ3≠θ1). In other words, the three stay portions 73, 74 and 75 are arranged asymmetrically with one another about the axial centerline P1, and thus the stay portions 73, 74 and 75 in the handling rod 11 has a sectional configuration asymmetrical about the axial centerline P1. The reasons why the three stay portions 73, 74 and 75 are arranged about the axial centerline P1 of the handling rod 11 at non-equal angular intervals will be set out later.

Figure 8:
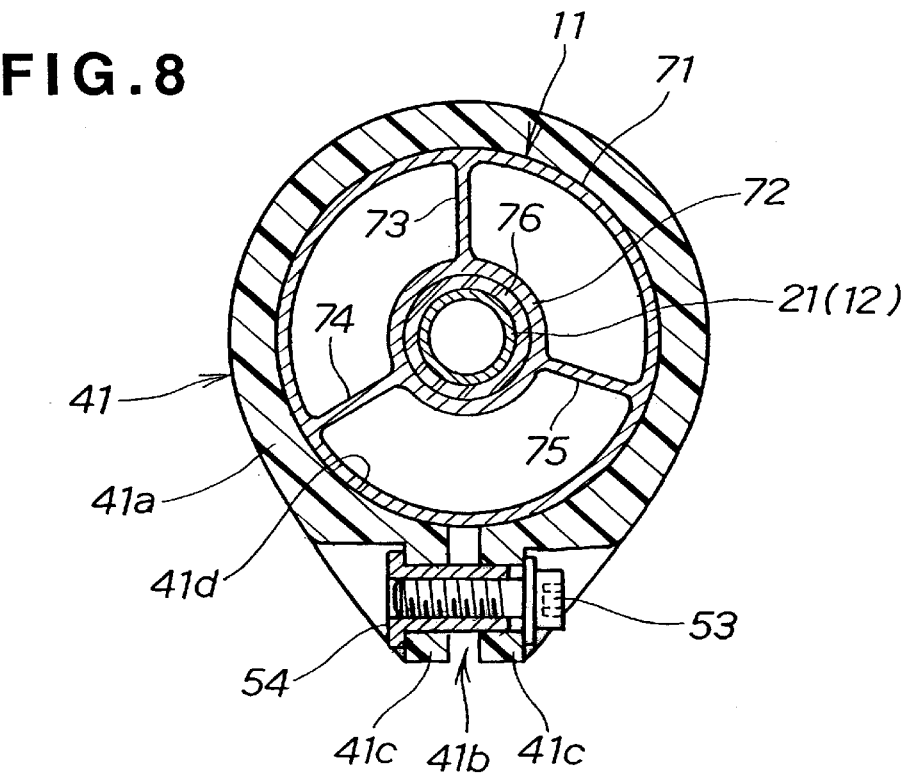
FIG. 8 is a sectional view taken along the 8—8 line of FIG. 4, which particularly shows how the handling rod and handling-rod mounting portion are coupled with each other.

FIG. 8 is a sectional view taken along the 8—8 line of FIG. 4, which shows how the handling rod 11 is coupled with the handling-rod mounting portion 41. As shown, the drive shaft 12 is passed through the inner pipe portion 72 of the handling rod 11 and supported via a bushing 76 that is cylindrical sliding bearings fitted within the inner pipe portion 72.

The handling-rod mounting portion 41 is generally in the form of a cylinder 41a having a slit 41b and a pair of flanges 41c opposed to each other with the slit 41b interposed therebetween. The outer pipe portion 71 of the handling rod 11 is fitted in an axial through-hole 41d of the cylinder 41a, and the opposed flanges 41c are held together by means of a bolt 53 so that the one end portion of the outer pipe portion 71 is frictionally secured to the inner surface of the handling-rod mounting portion 41.

Figure 9:
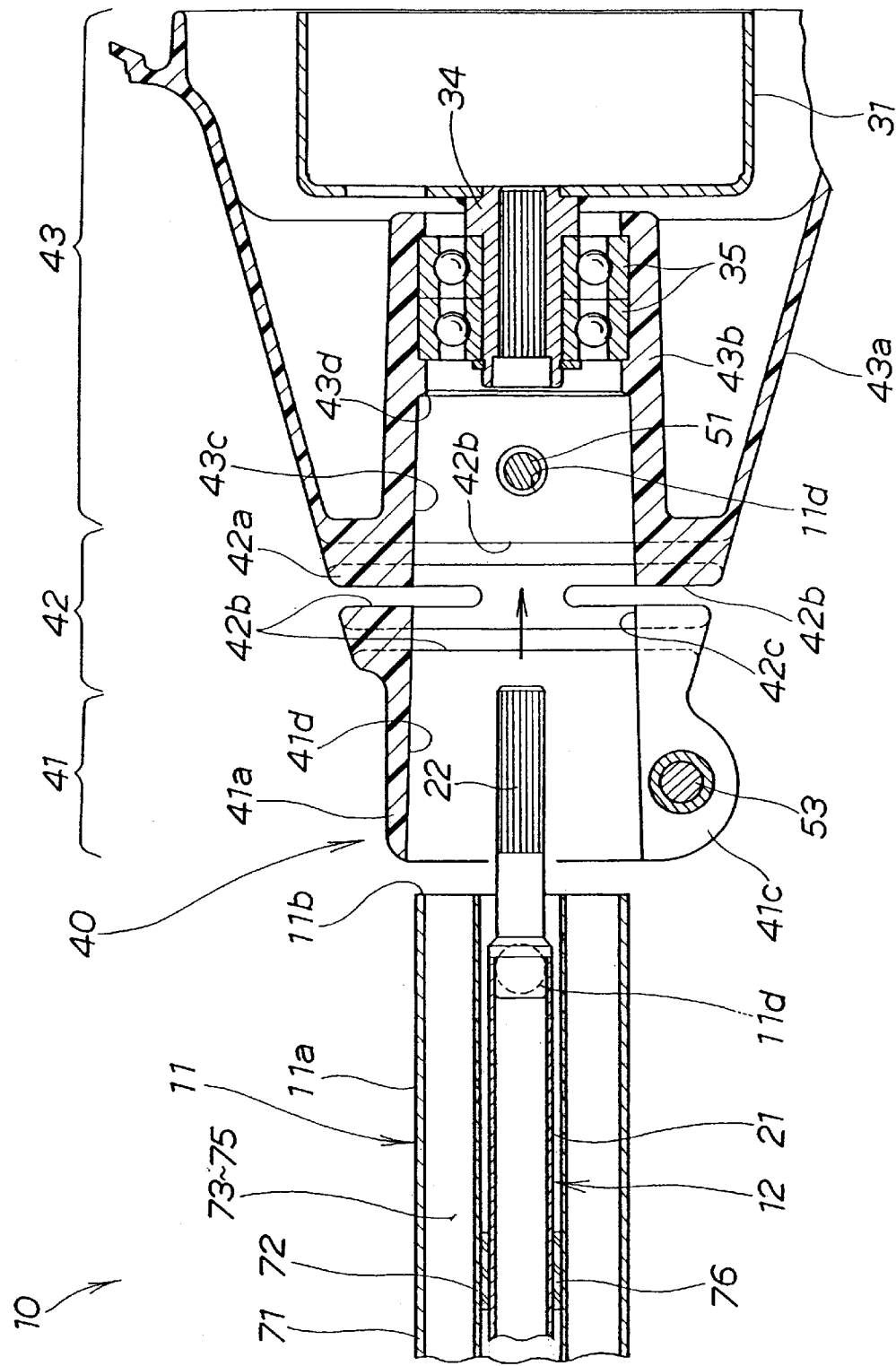
FIG. 9 is a sectional view corresponding to FIG. 4, which shows the handling rod and clutch case in a non-coupled state just for clarity of illustration.

FIG. 9 is an exploded sectional view corresponding to FIG. 4, which shows the handling rod 11 and clutch case 40 in a non-coupled state just for clarity of illustration. As shown, the axial through-hole 41d of the handling-rod mounting portion 41, axial through-hole 42c of the flexible coupling portion 42 and axial loosely-fitting hole 43c of the drive-source mounting portion 43 together form an axially-continuous hole tapering off toward the abutting region 43d.

When the one end portion 11a of the handling rod 11 is inserted via the axial through-hole 41d, through the axial through-hole 42c, into the loosely-fitting hole 43c in a direction indicated by a right arrow in FIG. 9, the end surface 11b of the handling rod 11 abuts against the abutting region 43d that is a stepped end surface formed on an inner peripheral surface of the drive-source mounting portion 43 defining the loosely-fitting hole 43c. Note that the end surface 11b is a flat surface perpendicular to the axis of the rod 11. The loosely-fitting hole 43c is tapered to progressively decrease in diameter in the direction toward the drive force unit 13, and its deepest portion adjacent to the abutting end surface 43d has a diameter slightly greater than the outer diameter of the outer pipe portion 71 of the handling rod 11.

The clutch case 40 constructed in the above-described manner operates as follows.

In the instant embodiment, the clutch case 40 is characterized in that the function of supporting the drive source unit 13 and the function of attenuating vibrations transmitted from the drive source unit 13 to the handling rod 11 are performed independently of each other; namely, the clutch case 40 performs the drive-source supporting function and vibration isolation function separately without an operating correlation between the two functions.

More specifically, the drive-source mounting portion 43 can be supported in the axial direction with the end surface 11b of the handling rod 11 abutting against the abutting end surface 43d of the mounting portion 43. Thus, the drive source unit 13 can be supported by the end surface 11b of the handling rod 11 via the drive-source mounting portion 43. Note that the drive-source mounting portion 43 can be reliably prevented from accidentally disconnecting from the handling rod 11 because it is coupled to the rod 11 via the flexible coupling portion 42 and handling-rod mounting portion 41 constructed in the above-described manner.

Further, since the loosely-fitting hole 43c has such a diameter as to receive the one end portion 11a of the handling rod 11 for axial sliding movement, there is formed a slight gap between the outer peripheral surface of the handling rod 11 and the inner wall surface of the drive-source mounting portion 43 defining the loosely-fitting hole 43c. The slight gap allows the drive source unit 13 to vibrate within certain limits about the one end portion 11a of the rod 11 supporting the unit 13; that is, the slight gap performs the vibration isolation function. Because the drive source unit 13 is axially supported by the end surface 11b of the handling rod 11 as noted above, there is no need for the flexible coupling portion 42 to support the unit 13, so that the flexible coupling portion 42 can fully perform its vibration attenuation function independently of the drive-source supporting function.

In the above-described manner, the instant embodiment can significantly reduce the undesired vibrations that are transmitted from the drive source unit 13 to the handling rod 11 while at the same time allowing the rod 11 to reliably support the unit 13.

Figure 10:
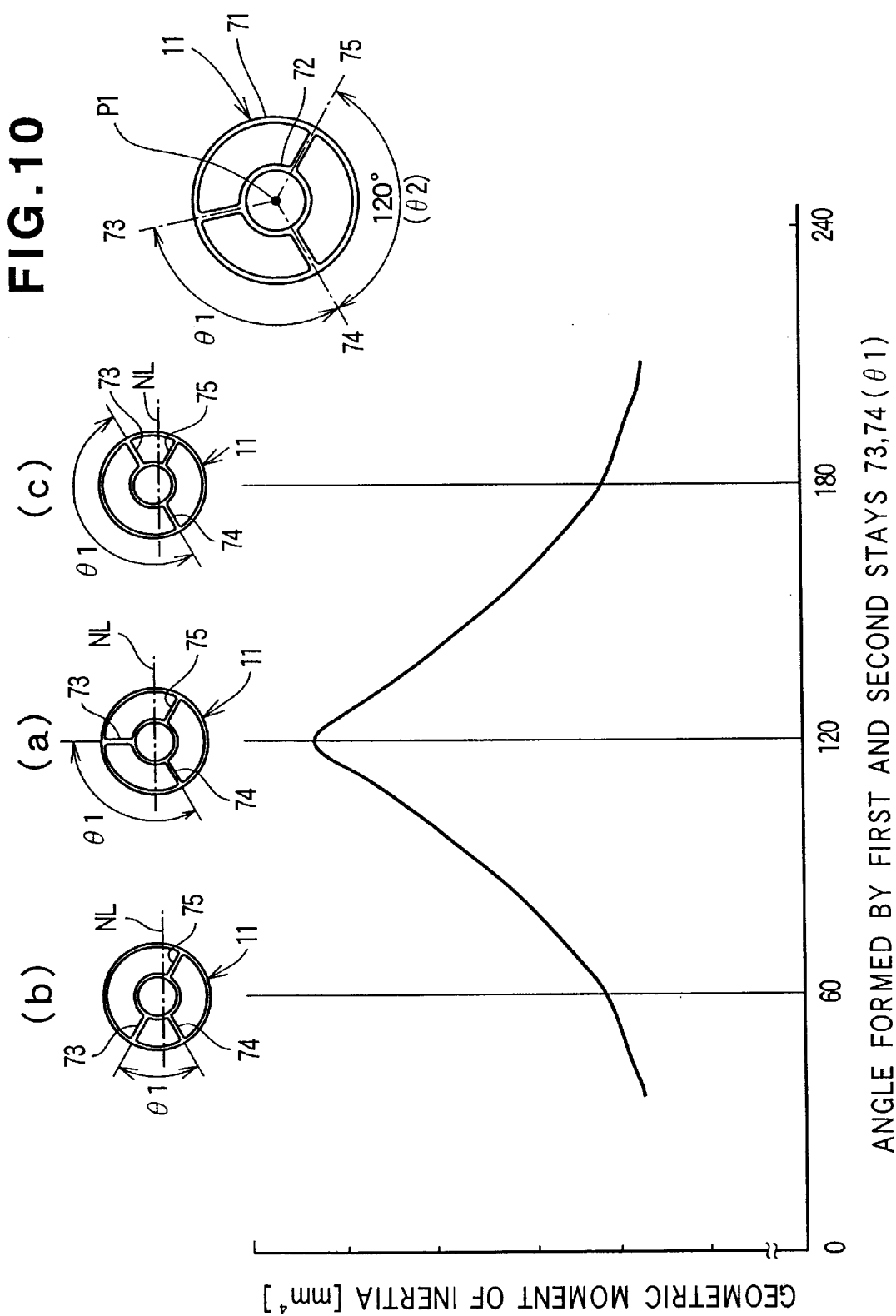
FIG. 10 is a diagram showing geometric-moment-of-inertia characteristics exhibited by the handling rod with respect to an angle formed by first and second radial stay portions of the rod.

FIG. 10 is a diagram showing geometric-moment-of-inertia characteristics exhibited by the handling rod 11 with respect to the angle θ1 formed by the first and second radial stay portions of the rod. In FIG. 10, the horizontal axis represents the angle θ1 between the first and second stay portions 73 and 74 of the handling rod 11, while the vertical axis shows the geometric moment of inertia I of the handling rod 11; note that the geometric moment of inertia here is expressed using a neutral axis NL as a base. Further, this diagram shows a variation in the rod's geometric moment of inertia I responsive to a variation in the angle θ1 between the first and second stay portions 73 and 74 with the angle θ2 between the second and third stay portions 74 and 75 fixed at 120°.

Specifically, section (a) of FIG. 10 shows the rod's geometric moment of inertia I when the angle θ1 is 120°. This example assumes that the rod's geometric moment of inertia I is "100".

Section (b) of FIG. 10 shows the rod's geometric moment of inertia I when the angle θ1 is 60°. In this example, the rod's geometric moment of inertia I is about "95" as compared to "100" in the instance of (a).

Section (c) of FIG. 10 shows the rod's geometric moment of inertia I when the angle θ1 is 180°. In this example, the rod's geometric moment of inertia I is about "95" as in the example of (b) of FIG. 10.

As clear from FIG. 10, the geometric moment of inertia I of the handling rod 11 presents a characteristic curve that takes the maximum value under the angular conditions denoted in section (a) of FIG. 10 and progressively decrease in value as the angular conditions approach those denoted in section (b) or (c) of FIG. 10. The following paragraphs describe the reasons why the three stay portions 73, 74 and 75 are arranged about the axial centerline P1 of the handling rod 11 at non-equal angular intervals or in asymmetrical relation to one another, in consideration of such geometric moment-of-inertia characteristics.

Because of the asymmetrical sectional configuration of the stay portions 73 to 75 in the handling rod 11, the geometric moment of inertia I of the handling rod 11 takes different values in all angular positions of the rod 11; that is, the geometric moment of inertia I takes different values in all the angular positions about the axial centerline P1. Thus, the inherent vibrating frequency of the handling rod 11 takes different values in all the angular positions about the axial centerline P1.

Further, vibrations transmitted from the drive source unit 13 to the handling rod 11 can vary in direction over a 360° range about the rod's axial centerline P1, under the influence of vibrations caused by rotations of the crankshaft of the drive source unit 13; namely, the vibrating direction of the handling rod 11 can vary successively over the 360° range about the rod's axial centerline P1.

Now, let's consider a case where the vibrating frequency of vibrations produced in a given vibrating direction and transmitted from the drive source unit 13 has coincided with the rod's inherent vibrating frequency of that given vibrating direction. However, as noted earlier, the inherent vibrating direction of the handling rod 11 takes different values in all the angular positions about the rod's axial centerline P1. Therefore, even when the vibrating frequency in the given vibrating direction has coincided with the rod's inherent vibrating frequency of the given vibrating direction, the frequency coincidence is limited to just one of the angular positions of the rod 11; in other words, the resonant vibrations occur only in the one angular position of the rod 11. Besides, the frequency coincidence passes the one angular position very quickly. Namely, even when the vibrating frequency in a given vibrating direction has coincided with the rod's inherent vibrating frequency, such frequency coincidence is merely a temporary or passing occurrence, so that resonant vibrations of the handling rod 11 can be avoided relatively easily.

Furthermore, since the handling rod 11 is in the form of an integrally-formed dual pipe structure where the inner and outer pipe portions 72 and 71 are interconnected via the stay portions 73 to 75 extending in the longitudinal direction of the pipe portions 72 and 71 and angularly spaced from one another with the different angles θ1 to θ3, the rod 11 can be manufactured as a one-piece component part having a simplified sectional configuration although it can exhibit great torsional and bending rigidity. In addition, the handling rod 11 in the instant embodiment can have the same sectional area and hence the same overall weight as in a case where the angles θ1, θ2 and θ3 are set to be equal to one another.

Because the handling rod 11 in the instant embodiment is manufactured as an integrally-formed, one-piece component part having a simplified sectional configuration as set forth above, the rod 11 can be significantly reduced in manufacturing cost and overall weight as compared to the conventional counterparts.

The instant embodiment constructed in the above-described manner can effectively avoid vibrations of the handling rod 11 resonant with vibrations transmitted from the drive source unit 13 to the rod 11 and reduce the cost and weight of the rod 11 while securing the necessary mechanical strengths, such as torsional and bending strengths, of the rod 11.

It is more preferable that the angle θ1 formed by the first and second stay portions 73 and 74 be greater than 90° but smaller than 120° (90°<θ1<120°). Because, if the angle θ1 is a relatively great angle less than 120°, three angles Θ1, θ2 and θ3 can become closer to one another, which will achieve better balance of the geometric moment of inertia I in any angular positions of the rod 11 and also secure relatively great values of the geometric moment of inertia I. The most preferable angle θ1 is about 110°, in which case the angles θ2 and θ3 may be 120° and 130°, respectively. Because, the angle θ1 set to 110° will advantageously allow the rod's geometric moment of inertia I to approach the maximum value as mentioned in relation to (a) of FIG. 10.

Because only the angles θ1 to θ3 are variable with the total number of the stay portions 73 to 75 left unchanged as set forth above, the instant embodiment can secure relatively great values of the geometric moment of inertia I without changing the weight of the handling rod 11. Therefore, the inherent vibrating frequency of the rod 11 can be set to a relatively great value. Namely, the inherent vibrating frequency of the rod 11 can be easily set to be greater than all possible vibrating frequencies of vibrations transmitted from the drive source unit 13 to the rod 11, with the result that resonant vibrations of the handling rod 11 can be avoided relatively easily.

It should be appreciated that the arranged order of the first, second and third radial stay portions 73, 74 and 75 may be clockwise rather than counterclockwise as illustratively shown in the FIG. 7.

The present disclosure relates to the subject matter of Japanese Patent Application No. 2001-062498, filed Mar. 6, 2001, the disclosure of which is expressly incorporated herein by reference in its entirety.

What is claimed is:

1. A plant cutter apparatus comprising:

a one-piece handling rod having an outer pipe portion, an inner pipe portion disposed concentrically within the outer pipe portion, and first, second and third radial stay portions extending between and interconnecting the outer pipe portion and the inner pipe portion, the first, second and third radial stay portions being arranged at non-equal angular intervals such that an angle θ1 formed between the first and second stay portions, an angle θ2 formed between the second and third stay portions, and an angle θ3 formed between the third and first stay portions differ from each other;

a drive shaft extending through the inner pipe portion and rotatably supported within the inner pipe portion via a bushing disposed between the drive shaft and the inner pipe portion;

a drive source unit mounted at one end of the handling rod for rotating the drive shaft; and a cutter blade mounted at another end of the handling rod and connected to the drive shaft for rotation therewith.

2. A plant cutter apparatus as claimed in claim 1; wherein the angle θ1 formed between the first and second radial stay portions is greater than 60° but smaller than 120°.

3. A plant cutter apparatus as claimed in claim 2; wherein the angle θ1 formed between the first and second radial stay portions is about 110°, the angle θ2 formed between the second and third radial stay portions is about 120°, and the angle θ3 formed between the third and first radial stay portions is about 130 °.

4. A plant cutter apparatus as claimed in claim 1; wherein each of the first, second and third radial stay portions has a rectilinear configuration.

5. A plant cutter apparatus comprising:

a handling rod having a one-piece structure comprised of a first tubular portion, a second tubular portion disposed within the first tubular member, and a plurality of connecting portions integrally connecting the first tubular portion and the second tubular portion in spaced-apart relation to one another;

a drive shaft mounted in the second tubular portion for undergoing rotation;

a drive source unit mounted at one end of the handling rod for rotationally driving the drive shaft; and a cutting member mounted at another end of the handling rod and connected to the drive shaft for rotation therewith.

6. A plant cutter apparatus as claimed in claim 5; wherein the connecting portions are arranged asymmetrically with respect to each other about an axial centerline of the handling rod.

7. A plant cutter apparatus as claimed in claim 5; wherein the connecting portions are arranged at non-equal intervals around an axial centerline of the handling rod.

8. A plant cutter apparatus as claimed in claim 5; wherein the plurality of connecting portions comprise a first connecting portion, a second connecting portion disposed at an angle θ1 relative to the first connecting portion, and a third connecting portion disposed at an angle θ2 relative to the second connecting portion and at an angle θ3 relative to the first connecting portion; and wherein the formed between the third and first stay portions differ from each other; and wherein the angles θ1, θ2 and θ3 differ from one another.

9. A plant cutter apparatus as claimed in claim 8; wherein the angle θ1 is greater than 60° but smaller than 120°.

10. A plant cutter apparatus as claimed in claim 8; wherein the angle θ1 is about 110°, the angle θ2 is about 120°, and the angle θ3 is about 130°.

11. A plant cutter apparatus as claimed in claim 8; wherein the angle θ1 is greater than 60° but smaller than 120°.

12. A plant cutter apparatus as claimed in claim 5; wherein each of the connecting portions has a rectilinear configuration.

13. A plant cutter apparatus as claimed in claim 5; wherein the second tubular portion is disposed concentrically within the first tubular portion.

14. A plant cutter apparatus as claimed in claim 5; further comprising a bearing member disposed between the drive shaft and the second tubular portion for rotationally supporting the drive shaft relative to the second tubular portion.

15. A plant cutter apparatus as claimed in claim 5; wherein the handling rod is formed of a single piece of material.

16. A plant cutter apparatus as claimed in claim 5; wherein the plurality of connecting members comprises only three stay portions each having a rectilinear configuration.

* * * * *